US010953321B2

(12) United States Patent
Van Beek

(10) Patent No.: US 10,953,321 B2
(45) Date of Patent: Mar. 23, 2021

(54) DEVICE FOR PLACING THEREON A STEERING WHEEL CONSOLE AND PEDAL CONSOLE OF A RACE SIMULATOR GAME, AND A RACE SIMULATOR

(71) Applicant: Maas Van Beek, Barneveld (NL)

(72) Inventor: Maas Van Beek, Barneveld (NL)

(\*) Notice: Subject to any disclaimer, the term of this patent is extended or adjusted under 35 U.S.C. 154(b) by 0 days.

(21) Appl. No.: 16/472,334

(22) PCT Filed: Dec. 22, 2017

(86) PCT No.: PCT/NL2017/050876
§ 371 (c)(1),
(2) Date: Jun. 21, 2019

(87) PCT Pub. No.: WO2018/117845
PCT Pub. Date: Jun. 28, 2018

(65) Prior Publication Data
US 2019/0358536 A1    Nov. 28, 2019

(30) Foreign Application Priority Data

Dec. 23, 2016  (NL) ...................................... 1042194
May 11, 2017  (NL) ...................................... 2018898

(51) Int. Cl.
| A63F 13/245 | (2014.01) |
| A63F 13/54 | (2014.01) |
| A63F 13/24 | (2014.01) |
| G09B 9/02 | (2006.01) |
| G09B 9/00 | (2006.01) |

(Continued)

(52) U.S. Cl.
CPC ............ *A63F 13/245* (2014.09); *A63F 13/24* (2014.09); *A63F 13/54* (2014.09); *A63F 13/90* (2014.09); *G09B 9/00* (2013.01); *G09B 9/02* (2013.01); *G09B 9/04* (2013.01); *G09B 9/05* (2013.01); *A63F 13/803* (2014.09); *A63F 13/98* (2014.09); *A63F 2300/1043* (2013.01);
(Continued)

(58) Field of Classification Search
None
See application file for complete search history.

(56) References Cited

U.S. PATENT DOCUMENTS 6,083,106 A    7/2000  McDowell
7,662,042 B2   2/2010  Oswald
(Continued)

FOREIGN PATENT DOCUMENTS

| NL | 2012740 B1 | 2/2016 |
| WO | 0152958 A1 | 7/2001 |
| WO | 2010059034 A1 | 5/2010 |

*Primary Examiner* — Jason T Yen
(74) *Attorney, Agent, or Firm* — David Guerra

(57) ABSTRACT

A device (10) for placing thereon a steering wheel console (12) and a pedal console (14) of a race simulator game. The device comprises a base frame (24) configured to be set up on the floor and a pivot frame (26) which is connected with the base frame (24) in a manner pivotable about a horizontal axis. Further, the device is provided with a steering wheel console support (18), pedal console support (20) and a connection provision for connecting a chair (22), which are all directly connected with the pivot frame (26). Further, a race simulator is described, which includes a chair, a steering wheel console and a pedal console and possibly a display which are all mounted on the pivot frame of the device.

20 Claims, 9 Drawing Sheets

(51) Int. Cl.
    *G09B 9/05*            (2006.01)
    *A63F 13/90*          (2014.01)
    *G09B 9/04*            (2006.01)
    *A63F 13/803*        (2014.01)
    *A63F 13/98*         (2014.01)

(52) U.S. Cl.
    CPC . *A63F 2300/1062* (2013.01); *A63F 2300/302* (2013.01); *A63F 2300/8017* (2013.01)

(56) References Cited

U.S. PATENT DOCUMENTS

| | | | | |
|---|---|---|---|---|
| 2004/0254020 | A1* | 12/2004 | Dragusin | A47C 15/004 463/46 |
| 2005/0159219 | A1* | 7/2005 | Oswald | A63F 13/98 463/36 |
| 2005/0255925 | A1* | 11/2005 | Brase | A47C 3/16 463/47 |
| 2009/0163283 | A1* | 6/2009 | Childress | A63F 13/28 463/47 |
| 2017/0056763 | A1* | 3/2017 | Smit | A63F 13/24 |
| 2017/0113150 | A1* | 4/2017 | Lee | A63F 13/803 |

* cited by examiner

DEVICE FOR PLACING THEREON A STEERING WHEEL CONSOLE AND PEDAL CONSOLE OF A RACE SIMULATOR GAME, AND A RACE SIMULATOR

CROSS-REFERENCE TO RELATED APPLICATIONS

This application is an U.S. national phase application under 35 U.S.C. § 371 based upon International Application No. PCT/NL2017/050876 filed on Dec. 22, 2017. Additionally, this U.S. national phase application claims the benefit of priority of International Application No. PCT/NL2017/050876 filed on Dec. 22, 2017, Netherland Application No. 1042194 filed on Dec. 23, 2016 and Netherland Application No. 2018898 filed on May 11, 2017. The entire disclosures of the prior applications are incorporated herein by reference. The international application was published on Jun. 28, 2018 under Publication No. WO 2018/117845 A1.

FIELD

This invention relates to a device for placing thereon a steering wheel console and a pedal console of a race simulator game.

BACKGROUND

From NL2012740C a device of this kind is known, where a chair and the supports for placement of a steering wheel console and a pedal console are adjustably connected with a frame. WO 2010/059034 describes a similar device. US 2005/0159219 describes a device where the pedal console is pivotally connected with the frame.

SUMMARY

The position of the driver in a rally race car differs considerably from the position of the driver of a Formula 1 race car. The insight underlying the invention is that it is desired to provide a race simulator which is suitable for simulating different types of cars, such as, for example, a rally race car and a Formula 1 race car. The object of the invention is to provide a device for placing thereon a steering wheel console and a pedal console of a race simulator game, whereby the device can be brought from a rally race position into a Formula 1 position with a simple adjusting possibility.

To this end, the invention provides a device according to claim 1. More particularly, the invention provides a device for placing thereon a steering wheel console and a pedal console of a race simulator game, comprising:
  a frame;
  a steering wheel console support;
  a pedal console support; and
  a connection provision for connecting a chair;
  characterized in that the frame comprises:
  a base frame configured to be set up on the floor; and
  a pivot frame connected with the base frame in a manner pivotable about a horizontal axis;
  wherein the steering wheel console support, the pedal console support and the connection provision for connecting a chair are directly connected with the pivot frame so that with a pivot movement of the pivot frame these parts together pivot along.

Thus, by a simple pivoting of the pivot frame, the device can be brought in a rally race position and a Formula 1 position very easily. This simple adjustment is the result of the fact that the steering wheel console support, the pedal console support and the connection provision for connecting a chair are all supported by the pivot frame. Thus, the invention is eminently suitable to be used in a race simulator for simulating different types of cars, for example, a rally race car and a Formula 1 race car.

Further elaborations of the invention are described in the subclaims and will hereinafter, with reference being had to an example which is represented in the figures, be further clarified.

DETAILED DESCRIPTION

Figure 1:
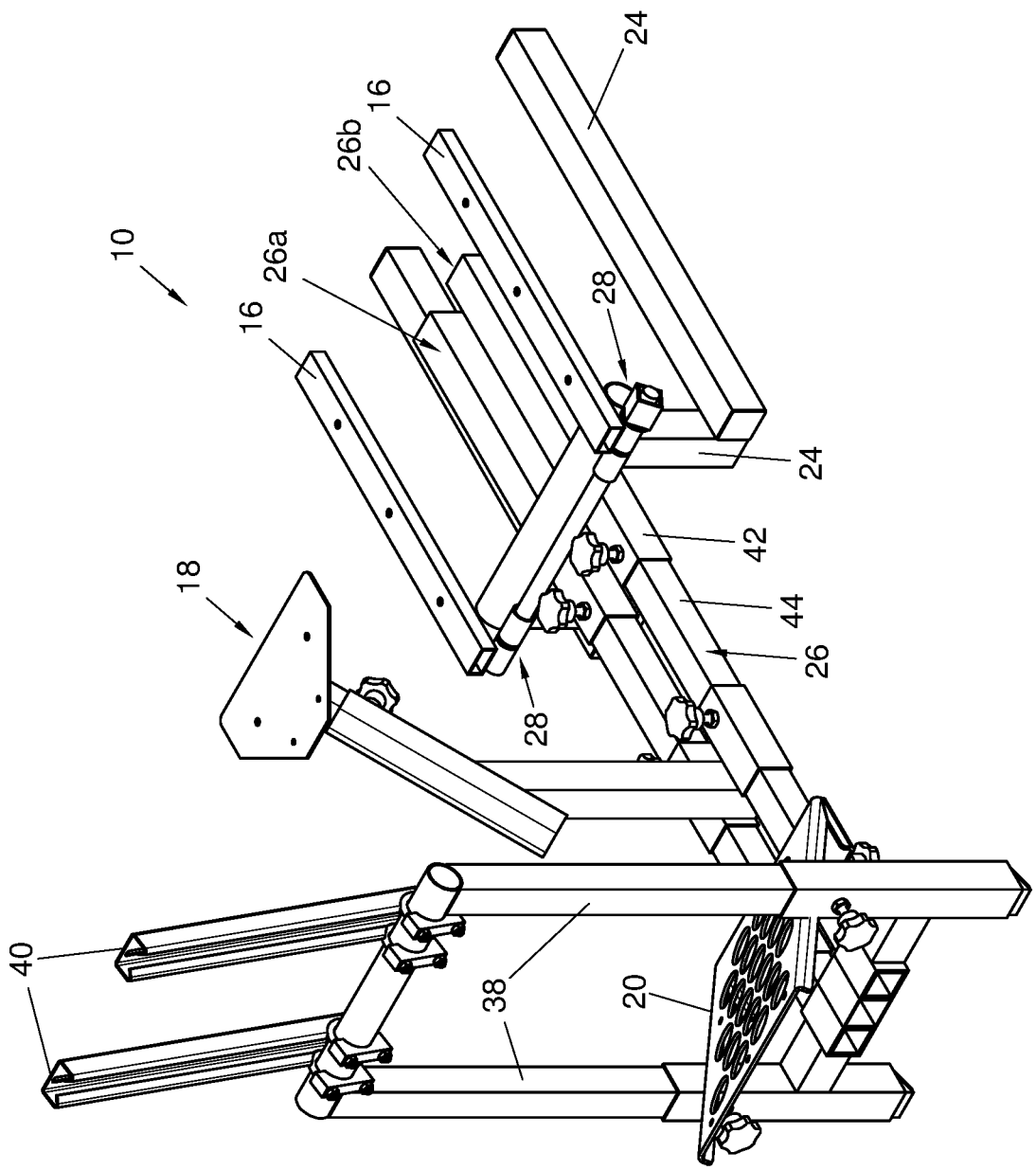
FIG. 1 shows an example of a device according to the invention in a first pivoted position which corresponds to the rally race position.
Figure 2:
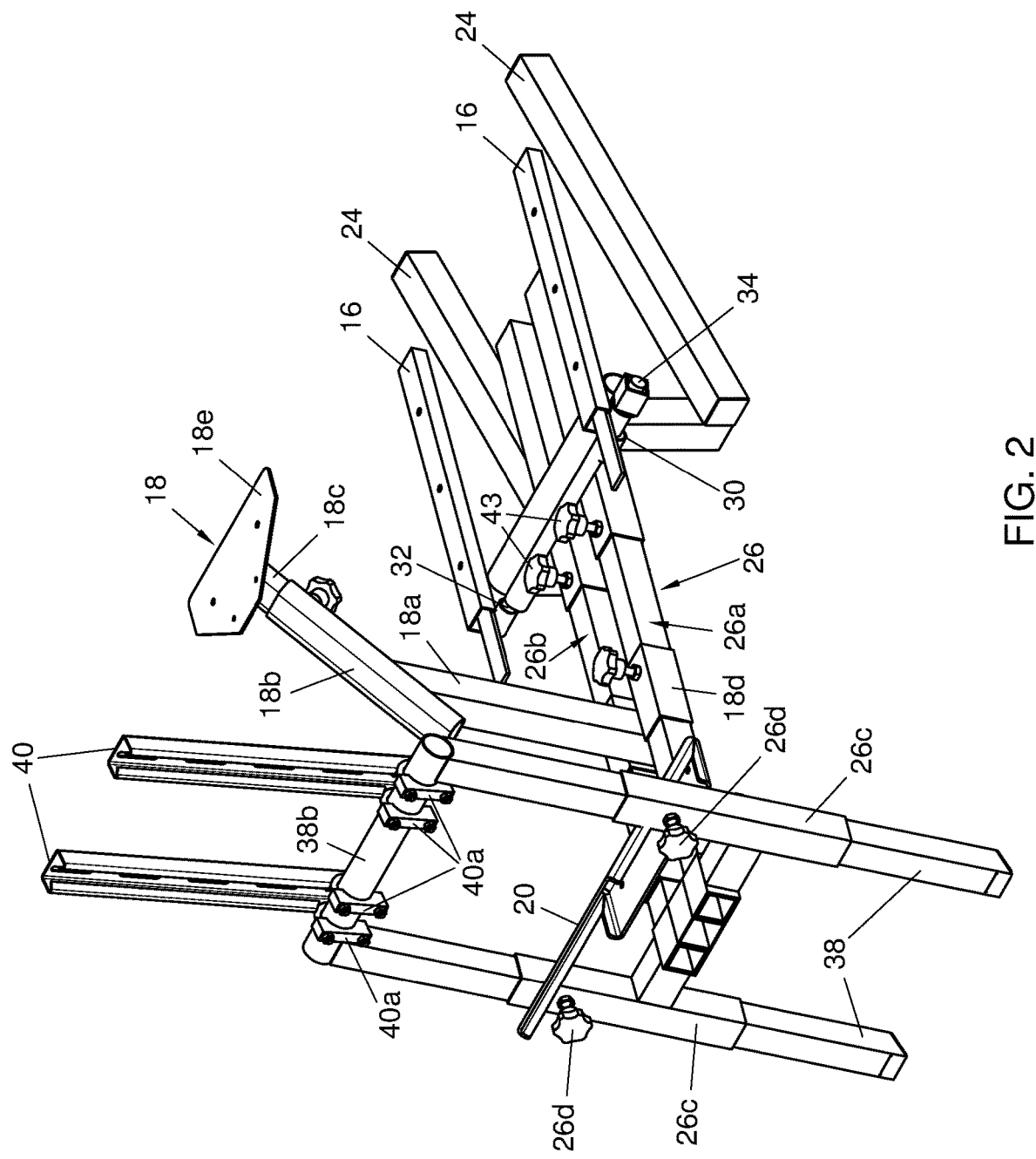
FIG. 2 shows the example of the device of FIG. 1 in the second pivoted position which corresponds to a Formula 1 position.
Figure 3:
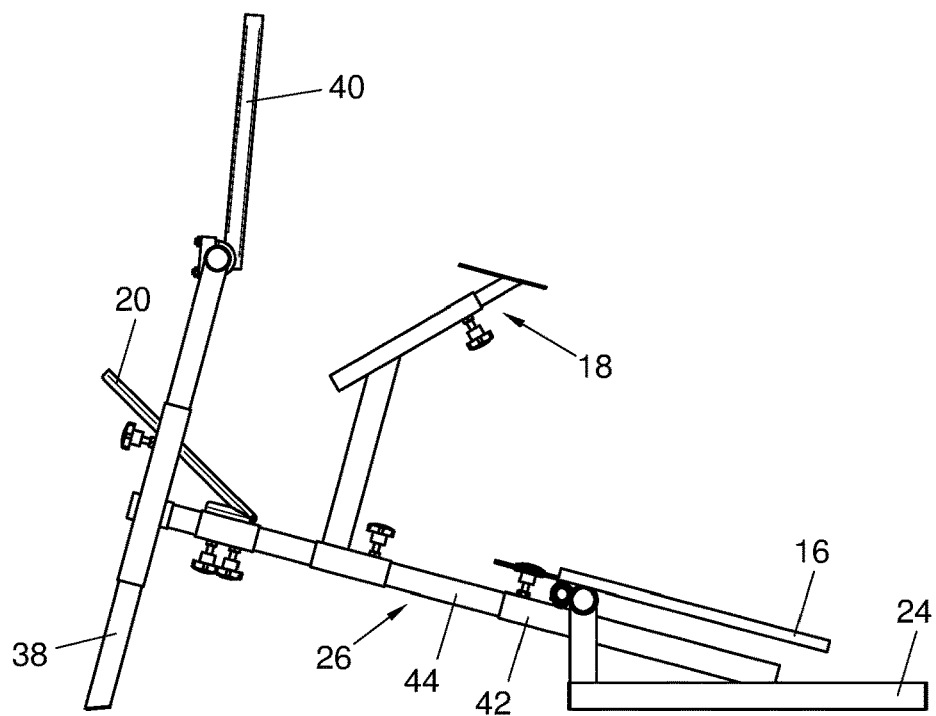
FIG. 3 shows a side view of the device as represented in FIG. 2.
Figure 4:
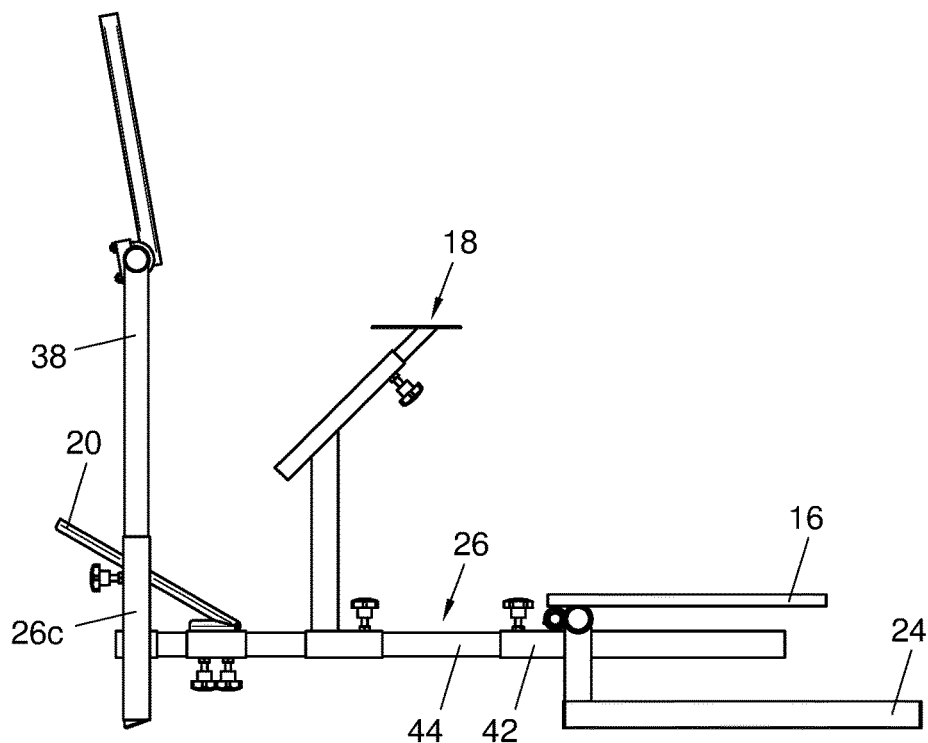
FIG. 4 shows a side view of the device as represented in FIG. 1.

In the following detailed description, with the aid of reference numerals, reference is had to the example that is represented in the figures. The embodiments that are described in the detailed description, however, are not limited to the example that is shown in the figures but may also be implemented in a different manner than shown in the example. The embodiments described in the detailed description should therefore be read and understood also without the reference numerals. The various embodiments to be described hereinafter can be used in combination with each other or independently of each other.

Most generally, the invention provides a device 10 for placing thereon a steering wheel console 12 and a pedal console 14 of a race simulator game. An example of the device is shown in FIGS. 1-4.

The device comprises a frame 24, 26 which is provided with a steering wheel console support 18, on which the steering wheel console 12 is placed, a pedal console support 20 on which the pedal console 14 is placed, and a connection provision for connecting a chair 22.

The frame comprises a base frame 24 which is configured to be set up on the floor and a pivot frame 26 which is connected with the base frame 24 in a manner pivotable about a horizontal axis. The steering wheel console support 18, the pedal console support 20 and the connection provision for connecting a chair 22 are directly connected with the pivot frame 26, such that all of these together pivot along with a pivot movement of the pivot frame 26.

The advantages have already been described hereinabove in the section headed "Summary" and are understood to be inserted here.

In an embodiment, the device 10 can comprise a fixation provision 28 for fixing the pivot frame 26 in a first pivoted position relative to the base frame 24.

With such a provision, the pivot frame 26 can be fixed relative to the base frame 24 in a pivoted position. The whole device 10 does not move anymore and is standing fixedly at that moment. The result is that the user, whilst playing a race simulator game, is sitting solidly, which is of benefit to the gaming sensation.

In an embodiment, the fixation provision 28 may be implemented as a pin-hole connection.

Such a connection is an effective solution, which can be simply and quickly operated. In addition, a pin-hole connection can be made of robust and relatively inexpensive construction. Possible alternatives include, for example, clamped joints, or electronic clamps which utilize magnets.

In an embodiment, the pin-hole provision 28 comprises at least one base frame hole 30 in the base frame 24, at least one pivot frame hole 32 in the pivot frame 26, and a pin 34. In the example shown in the figures, the base frame 24 is provided on opposite sides with a tubular section 30' which forms a base frame hole 30. Further, in the example shown, the pivot frame 26 is provided on opposite sides with a tube section 32' which forms the pivot frame hole 32. When a pivot frame hole 32 is in line with a base frame hole 30 and the pin 34 extends through both holes, the pivot frame 26 is fixed in the first pivoted position. A second pivoted position may for instance be taken up automatically when the pin 34 does not extend through the pivot frame hole 32 and the base frame hole 30. This second pivoted position may be taken up, for example, under the influence of gravity, so that the pivot frame 26—possibly by the weight of the user who is sitting himself down in the chair 22 or under the influence of the inherent weight of the pivot frame 26 with chair 22—automatically takes up the second pivoted position. When this second pivoted position is not desired, the pivot frame 26 may be fixed in the first pivoted position with the aid of the pin-hole provision 28.

In a further elaboration of the embodiment in which fixation provision 28 is implemented as a pin-hole connection, in the base frame 24 and/or in the pivot frame 26, more than one base frame hole 30 or pivot frame hole 32 may be provided, such that the pivot frame 26 is fixable, apart from the first pivoted position, at least in one further pivoted position, etc., with the aid of the pin 34.

In this way, the device 10 can be fixed in multiple pivoted positions in a stable manner instead of, for example, relying on gravity for the second pivoted position to be taken up automatically when the pin 34 does not extend through both a base frame hole 30 and a pivot frame hole 32.

In an embodiment, the device 10 can comprise a drive (not shown) for pivoting of the pivot frame 26 relative to the base frame 24. The drive may be chosen from the group consisting of: a gas spring, a hydraulic piston/cylinder assembly and an electric motor.

In this embodiment, a drive takes care of the pivoting of the pivot frame 26 relative to the base frame 24. Such pivoting then does not need to be done manually anymore. Optionally, the drive may further be made of self-locking design, so that the pivot frame 26 is fixable in different pivoted positions by the drive. An implementation with a drive for pivoting the pivot frame 26 is a higher-grade luxury form increasing convenience of use. Also, such a device enables individuals for whom the manual operation is too heavy (for example, small children or people with a physical challenge) to make unhindered use of the device 10 nonetheless.

In an embodiment of the device 10, the first pivoted position of the pivot frame 26 relative to the base frame 24 can correspond to a rally race position and the second pivoted position of the pivot frame 26 relative to the base frame 24 can correspond to a Formula 1 position.

In this embodiment, it is possible to set the device 10 in two different race positions, namely, a rally race position and a Formula 1 position, corresponding to, respectively, a first pivoted position of the pivot frame 26 relative to the base frame 24 and a second pivoted position of the pivot frame 26 relative to the base frame 24. This embodiment reflects full realization of the insight stated in the summary, that it is desired to provide a race simulator that is suitable for simulating different types of cars, such as, for example, a rally race car and a Formula 1 race car and where adjustment from one condition to the other condition can take place with a minimal intervention, namely, by pivoting the pivot frame 26 relative to the base frame 24.

In an embodiment, the pivot frame 26 may be provided with adjustable legs 38. The adjustable legs 38 are then adjustable such that in each pivoted position of the pivot frame 26 relative to the base frame 24, the legs 38 touch the floor on which the base frame 24 is stood.

In this embodiment, the device 10 is provided with legs 38 which touch the ground and thereby increase the stability of the device. If the fixation provision 28 is utilized, these legs 38 are not necessary. However, in placing a large weight on the device 10, for example, a steering wheel console 12, a pedal console 14, a chair 22, a display 58 and a user, this embodiment is of benefit in providing for an improved stability and for a lesser loading of the fixation provision 28. In the example shown, the legs 38 are mutually interconnected at the top with a transverse connection 38b. The legs 38 are implemented as tubular sections which are slidably received in bushes 26c which are fixedly connected with the pivot frame 26. With the aid of fixing bolts 26d provided with rotary knobs, the legs 38 can be fixed in different positions relative to the pivot frame 26.

In an embodiment, the device 10 can comprise a display support 40 which is connected with the pivot frame 26.

In an alternative embodiment, of which an example is shown in the figures, the device 10 can comprise a display support 40 which is connected with the legs 38. In the figures, the display support 40 can be mounted in different pivoted positions on the transverse connection 38b with the aid of demountable clips 40a.

Instead of setting up a display or projection screen loosely from the device 10, it is also possible in this embodiment to fixedly attach the display 58 to the device 10. In this way, the display 58 can be placed closer to the user, and the angle of view at which the display can be viewed is thus enlarged. This will intensify the user's race simulator gaming sensation. Moreover, due to the display 58 being connected with the pivot frame 26, the position of the display 58 will automatically change with adjustment of the pivot frame 26 and remain optimally oriented relative to the user of the device. When the display support 40 is connected with the pivot frame 26 directly, it will, upon pivoting of the pivot frame 26, pivot along. When, as in the alternative embodiment, of which an example is shown, the display support 40 is connected with the legs 38, the display 58 which is connected with the display support 40 will remain at approximately the same height, also when the pivot frame 26 pivots from the first pivoted position to the second pivoted position and vice versa.

In an embodiment, the pivot frame 26 can comprise a front pivot frame part 42 and a rear pivot frame part 44 (see, for example, FIG. 1). A position of the front pivot frame part 42 relative to the rear pivot frame part 44 is adjustable. Moreover, the front pivot frame part 42 is then fixable in different positions relative to the rear pivot frame part 44.

Users are not all equally tall. With a pivot frame 26 that comprises a front and a rear pivot frame part 42, 44 which are adjustable relative to each other, the difference in size between different users can be compensated.

In an embodiment, the steering wheel console support 18 and the pedal console support 20 may be mounted on the front pivot frame part 42. The connection provision 16 for connecting a chair 22 may then be arranged on the rear pivot frame part 44.

By arranging the connection provision 16 for connecting a chair 22 on the rear pivot frame part 44 and placing the other supports 18, 20 on the front pivot frame part 42, it is possible to adjust the pivot frame 26 to the user's leg length. When to the pivot frame 26 or to the legs 38 there is further connected a display support 40, then, with adjustment of the front pivot frame part 42 relative to the rear pivot frame part 44, also the distance between the chair 22 and the display 58 is set.

In an alternative embodiment, it is also possible to merely make the pedal console support 20 movable relative to the connection provision 16 for connecting a chair 22. The steering wheel console support 18 and, if present, the display support 40 would then remain in the same position relative to the connection provision for connecting a chair 22.

The embodiment in which the steering wheel console support 18 and the pedal console support 20 are connected directly, and the display support 40, if present, is connected directly or via the legs 38, to the front pivot frame part 42, is preferred because, given a difference in leg length, other bodily sizes of a user will also be different in more or less equal measure. Also the steering wheel console 12 and the display 58, if present, then need to be displaceable. With this embodiment, that is done most effectively in one go by adjusting the front pivot frame part 42 relative to the rear pivot frame part 44. This allows the device 10 to be adjusted faster into a condition that is ergonomically optimal for the user.

In this embodiment, not only can the pivot frame 26 be adjusted to the leg length of the user, but it is also possible to fix such adjustment. At that point, the whole device 10 is fixed. The result is that the user when playing a race simulator game is seated solidly, which is again of benefit to the gaming sensation.

In an embodiment, the front pivot frame part 42 may be connected with the rear pivot frame part 44 via a blockable hinge. In a blocked condition of the blockable hinge, the front pivot frame part 42 and the rear pivot frame part 44 pivot jointly. In a deblocked condition of the blockable hinge the front pivot frame part 42 and the rear pivot frame part 44 are pivotable independently of each other.

A pivot frame 26 with such a blockable hinge provides yet more flexibility as regards the setting of the device and moreover still allows a fairly quick desired setting of the sitting posture. When the blockable hinge is in the deblocked condition, for example, first the front pivot frame part 42 may be brought into and fixed in a desired position and then the rear pivot frame part 44 may be brought into and fixed in a desired position. In the blocked condition of the blockable hinge, the particularly quick adjustment of the sitting position from, for example, a rally race position to a Formula 1 position as already described above, is possible.

In an embodiment, the front pivot frame part 42 and the rear pivot frame part 44 are connected with each other with the aid of a telescopic connection 46.

In this embodiment, use is made of an effective, simple solution to displace and fix the two pivot frame parts 42, 44 relative to each other.

In an alternative implementation, the pivot frame parts 42, 44 may be connected with each other through guide rails or through bearings, such as, for example, slide bearings. The fixation of the pivot frame parts 42, 44 relative to each other may be realized with locking pins or locking bolts 43, as shown in the figures. In the examples in the figures, the locking bolts 43 are provided with hand-engageable knobs.

In an embodiment, of which an example is shown in the figures, the pivot frame 26 can comprise two parallel-extending telescopic section assemblies 26a, 26b. The two section assemblies 26a, 26b can each comprise two tubular sections slidable into and out of each other in a length direction.

This embodiment with two parallel telescopic section assemblies 26a, 26b provides for stable guiding. The advantage of two parallel section assemblies 26a, 26b over, for example, a single tube, is that the pivot frame 26 is stiffer and hence less subject to deformation and possible vibrations.

In an embodiment, the steering wheel console support 18 may be movable and fixable relative to the pivot frame 26.

By making the steering wheel console support 18 movable relative to the pivot frame 26, it is possible to place the steering wheel console 12 at the distance desired for the user. Thus, the device 10 can be adjusted better ergonomically.

In a further elaboration, of which an example is shown, the steering wheel console support 18 can comprise a first tubular section 18a which is provided at the lower end thereof with two tubular section-shaped bushes 18d which are slidably arranged on the tubular section assemblies 26a, 26b of the pivot frame 26 and can be fixed with the aid of fixing bolts 18e at a desired position on the pivot frame 26. In addition, the steering wheel console support 18 may be further provided with a second tubular section 18b which is connected with the first tubular section 18a and in which a third tubular section 18c is fixable in different positions relative to the second tubular section 18b. The second tubular section 18b in the example shown includes an angle with the first tubular section 18a of the steering wheel console support 18. At the end of the third tubular section 18c, a supporting plate 18e for the steering wheel console 12 is mounted.

In an embodiment, of which an example is shown in the figures, device 10 may be provided with a chair 22 which is connected with the pivot frame 26 with the aid of the connection provision 16 for connecting a chair 22.

To make the sensation in the different pivoted positions and the corresponding sitting positions, such as for example a rally race position and a Formula 1 position, as realistic as possible, the chair 22 may include a lower backrest part 22b and an upper backrest part 22c which is connected with the lower backrest part 22b in a manner pivotable about a horizontal central axis. The upper backrest part 22c, in a further elaboration of this embodiment, is fixable relative to the lower backrest part 22b in different pivoted positions.

Figure 7:
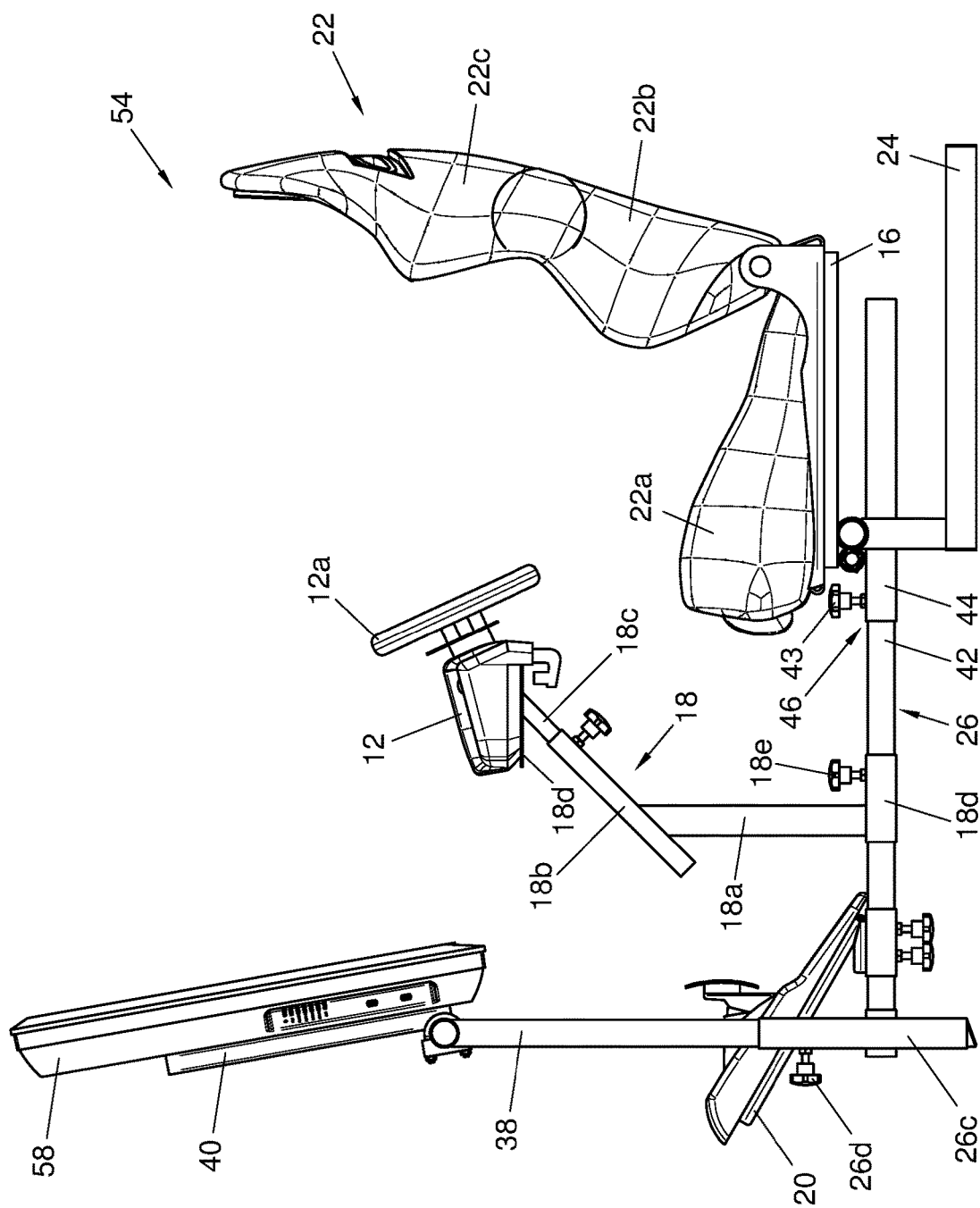
FIG. 7 shows a side view of the race simulator as represented in FIG. 5.
Figure 8:
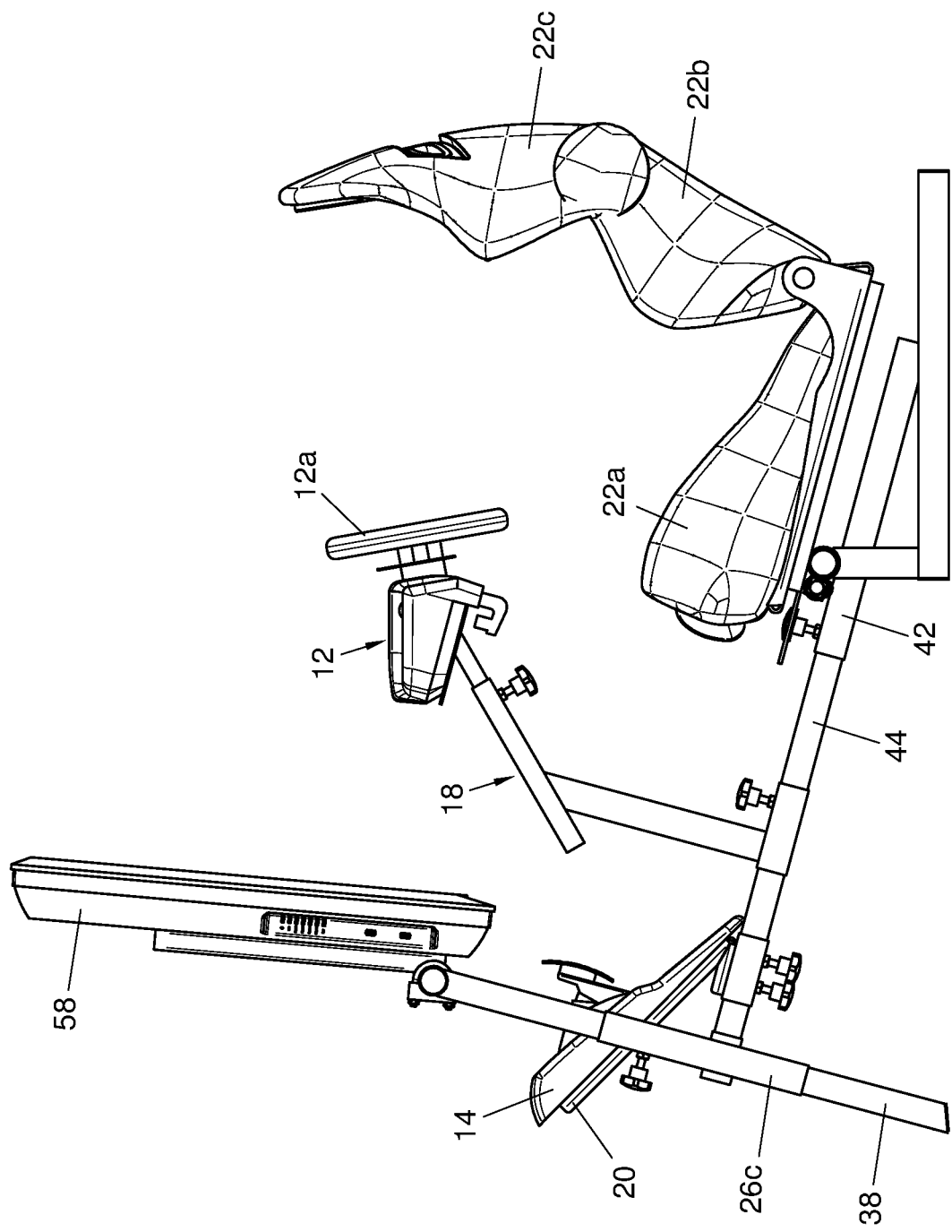
FIG. 8 shows a side view of the race simulator as represented in FIG. 6.

As is clearly visible in the two side views of the example in FIGS. 7 and 8, the chair 22 in the Formula 1 position (see FIG. 8) of the race simulator 54 is more in the form of a bucket seat in that the upper backrest part 22c has been tilted slightly forward relative to the lower backrest part 22b compared with the position represented in FIG. 7 which corresponds to the rally race position.

Figure 9:
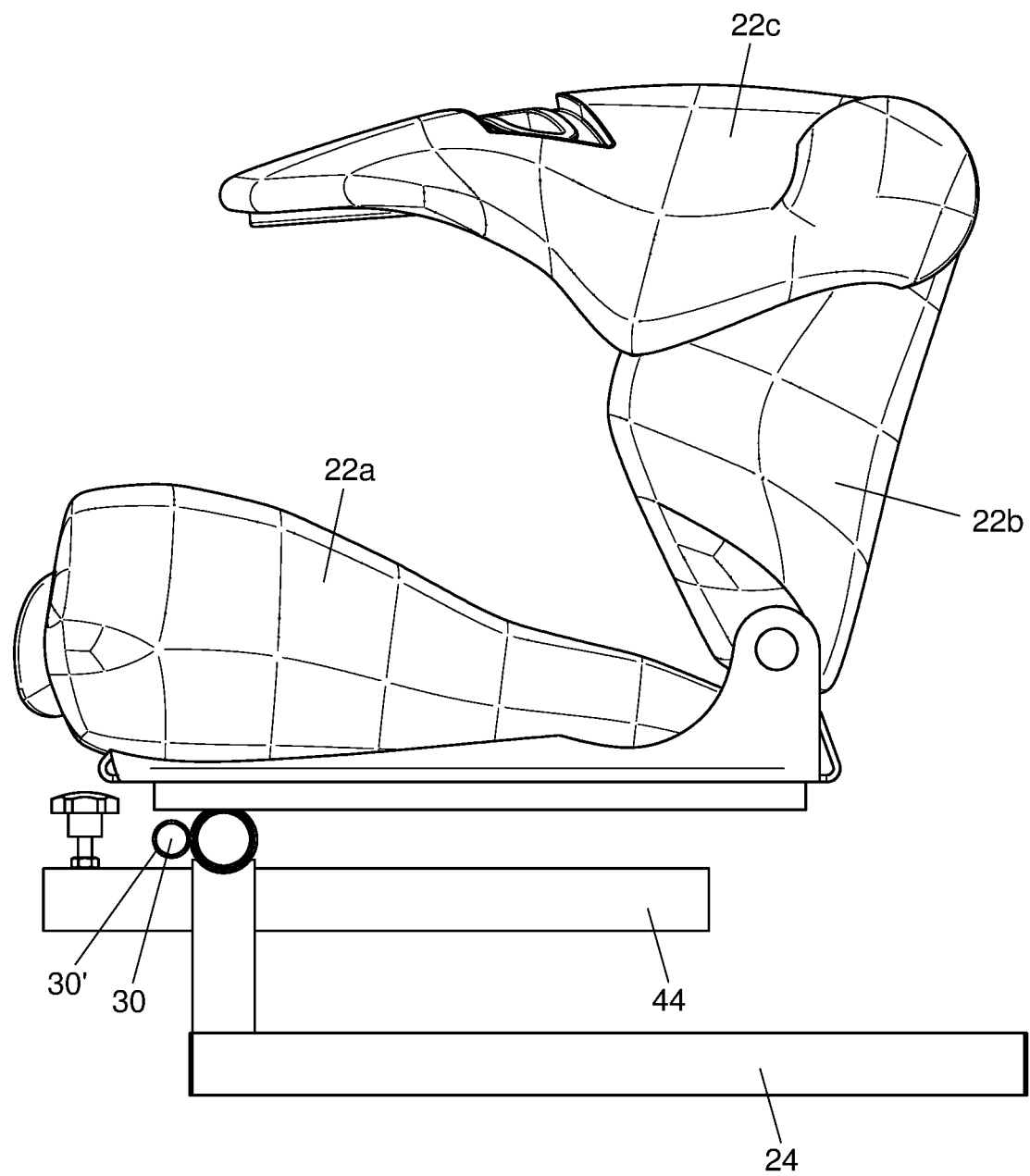
FIG. 9 shows a side view of the base frame and the rear pivot frame part with a chair mounted thereon in folded-in position.
Figure 10:
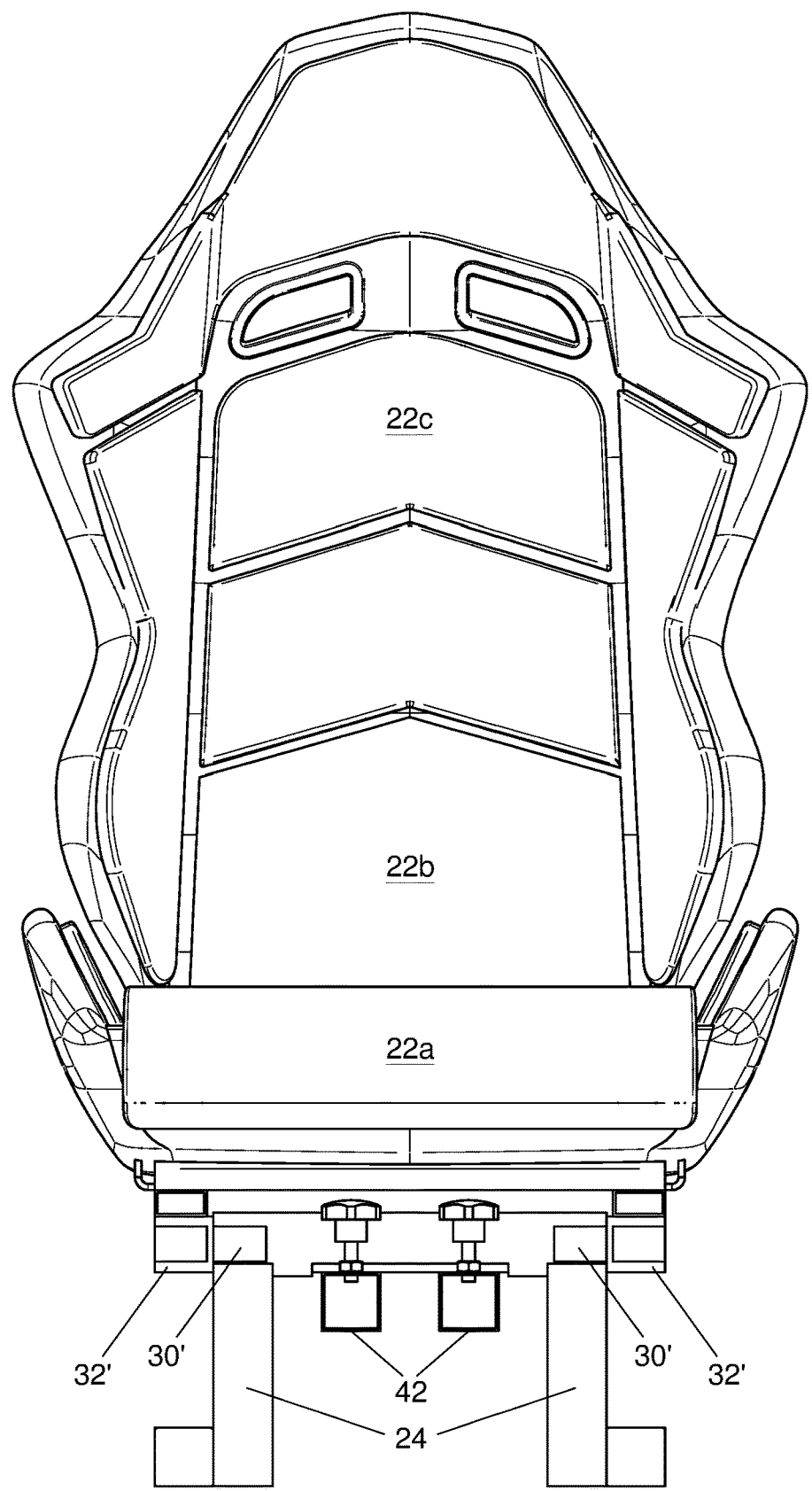
FIG. 10 shows a front view of the base frame and the rear pivot frame part with a chair mounted thereon in rally race position.

As shown in FIG. 9, the upper backrest part 22c may further be brought in a folded-in position, so that the device 10 can be packaged compactly when it is to be transported. It will be clear that also the lower backrest part 22b may be pivotable relative to the seat 22a of the chair 22 to provide a correct setup of the chair 22 for each user in each race simulation position.

Figure 5:
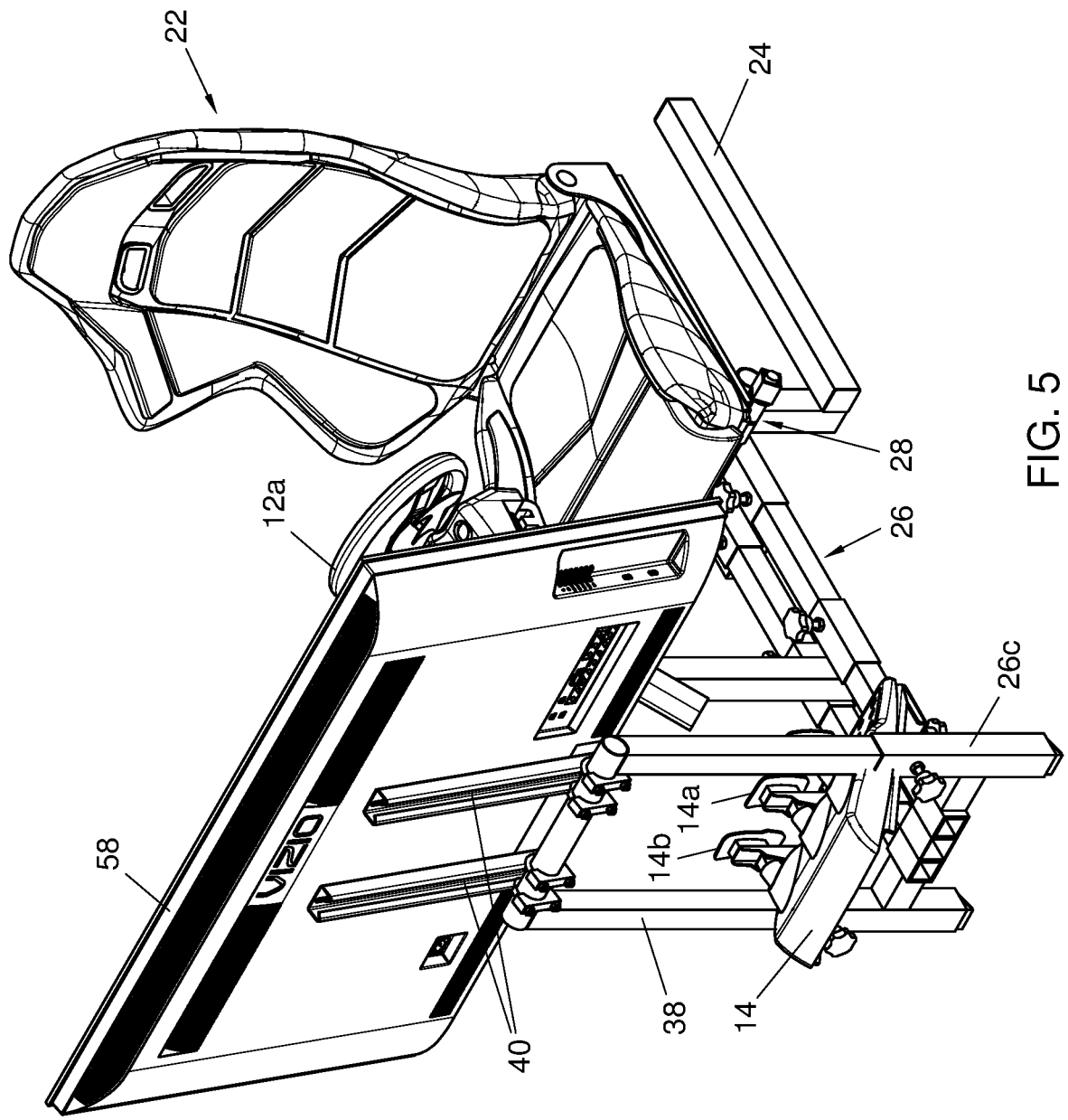
FIG. 5 shows an example of a race simulator according to the invention in a first pivoted position which corresponds to the rally race position.
Figure 6:
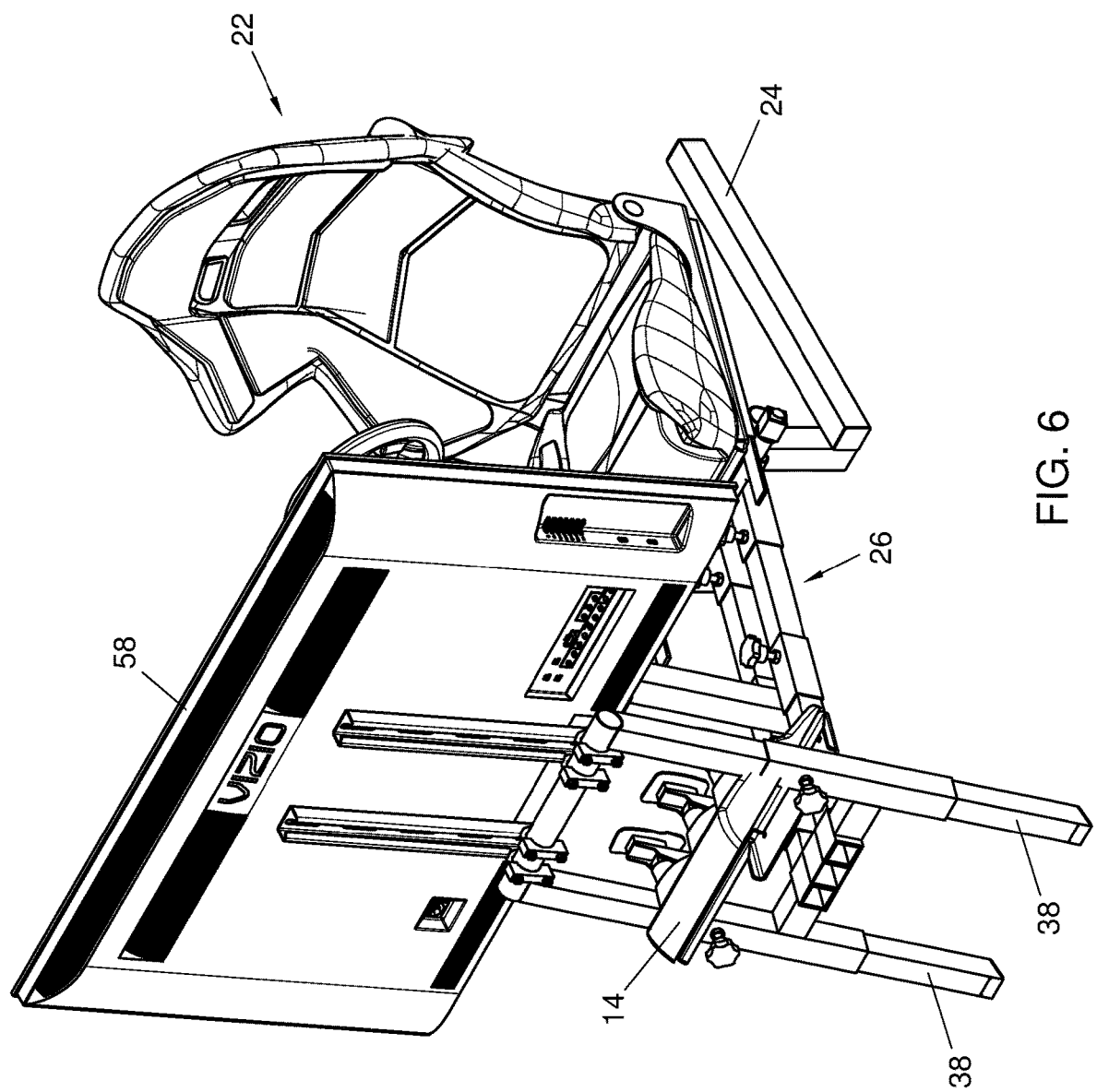
FIG. 6 shows an example of the race simulator of FIG. 5 in the second pivoted position which corresponds to the Formula 1 position.

The invention also provides a complete race simulator 54 which comprises a device 10 with chair 22 according to the invention and which is further provided with a steering wheel console 12 which is mounted on the steering wheel console support 18 and which is provided with a steering wheel 12a. The race simulator 54 is then also provided with a pedal console 14 which is mounted on the pedal console support 20 and which is provided with at least a brake pedal 14a and an accelerator pedal 14b. An example of such a race simulator 54 is shown in FIGS. 5-8. FIGS. 5 and 7 show the race simulator 54 in the rally race position. FIGS. 6 and 8 show the race simulator 54 in the Formula 1 position.

In an embodiment of the race simulator 54, in which the device 10 is provided with a display support 40, the race simulator 54 may further comprise a display 58 which is mounted on the display support 40.

The advantage of this embodiment is that a user has a complete race simulator 54 at hand directly. Only a computer needs to be connected to be able to start with a race simulation. The race simulator 54 may, if desired, be set in different positions for an optimum simulation sensation, among which a rally race position and a Formula 1 position.

The invention is not limited to the example shown in the figures. The above-described embodiments, as already indicated, may also be configured differently than shown in the example of the figures. The scope of protection is defined by the following claims in which the reference numerals have no limiting effect.

The invention claimed is:

1. A system for placing thereon a steering wheel console and a pedal console of a race simulator game, said system comprising:
   a base frame configured to be set up on a floor;
   a pivot frame pivotably connected with the base frame in a manner pivotable about a horizontal axis so that an angle of the pivot frame in relation to the base frame is adjustable;
   adjustable legs provided on the pivot frame, the legs being adjustable in length such that in each pivoted position of the pivot frame relative to the base frame the legs touch the floor;
   a steering wheel console support configured to support the steering wheel console associated with the race simulator game;
   a pedal console support configured to support the pedal console associated with the race simulator game; and
   a connection provision configured to connect with a chair;
   wherein the steering wheel console support, the pedal console support and the connection provision are directly connected with the pivot frame so that with a pivot movement of the pivot frame these parts together pivot along.

2. The system according to claim 1, further comprising a fixation provision configured to fix the pivot frame in a first pivoted position relative to the base frame.

3. The system according to claim 2, wherein the fixation provision is implemented as a pin-hole connection.

4. The system according to claim 3, wherein the pin-hole provision comprises:
   one or more base frame holes in the base frame;
   one or more pivot frame holes in the pivot frame; and
   a pin;
   wherein, when at least one of the pivot frame holes is in line with at least one of the base frame holes and the pin extends through both the aligned base and pivot frame holes, the pivot frame is fixed in the first pivoted position.

5. The system according to claim 1, further comprising a drive for pivoting the pivot frame relative to the base frame, the drive being selected from the group comprising at least one of a gas spring, a hydraulic piston/cylinder assembly, and an electric motor.

6. The system according to claim 2, wherein the first pivoted position of the pivot frame relative to the base frame is configured as a rally race position where the pivot frame is substantially parallel with the base frame, and a second pivoted position of the pivot frame relative to the base frame is configured as a Formula 1 position where the pivot frame is angled in relation to the base frame.

7. The system according to claim 1, further comprising a display support pivotably connected to the pivot frame or the legs so that a display mounted to the display support is positioned at an elevation above the steering wheel console.

8. The system according to claim 7, wherein the pivot frame comprises a front pivot frame part, and a rear pivot frame part, wherein a position of the front pivot frame part relative to the rear pivot frame part is adjustable and wherein the front pivot frame part is fixable in different positions relative to the rear pivot frame part.

9. The system according to claim 8, wherein the steering wheel console support and the pedal console support are connected on the front pivot frame part, and wherein the connection provision for connecting the chair is arranged on the rear pivot frame part.

10. The system according to claim 8, wherein the front pivot frame part is connected with the rear pivot frame part via a blockable hinge, wherein in a blocked condition of the blockable hinge the front pivot frame part and the rear pivot frame part pivot together, and wherein in a deblocked condition of the blockable hinge, the front pivot frame part is independently pivotable relative to the rear pivot frame part.

11. The system according to claim 10, wherein the front pivot frame part and the rear pivot frame part are connected with each other with the aid of a telescopic connection.

12. The system according to claim 1, wherein the pivot frame comprises two parallel-extending telescopic section assemblies, each of the section assemblies comprising two tubular sections slidable into and out of each other in a length direction.

13. The system according to claim 12, wherein the steering wheel console support is movable and fixable relative to the pivot frame.

14. The system according to claim 13, wherein the steering wheel console support comprises a first tubular section which is provided at a bottom with at least one bush which is slidably connected with the pivot frame and with the aid of fixing bolts is fixable at a desired position on the pivot frame, wherein the steering wheel console support comprises a second tubular section which is connected with the first tubular section and in which a third tubular section is fixable in different positions relative to the second tubular section, and wherein a supporting plate is associated with the third tubular section and is configured to mount thereon the steering wheel console.

15. The system according to claim 1, wherein the chair is provided with the system, and wherein the connection provision is configured to connect the chair with the pivot frame.

16. The system according to claim 15, wherein the chair has a seat and a backrest which includes a lower backrest part and an upper backrest part connected with the lower backrest part in a manner pivotable about a horizontal central axis, wherein the upper backrest part is fixable in different pivoted positions relative to the lower backrest part.

17. The system according to claim 1, wherein the legs are mutually interconnected at a distal end by the transverse connection, the legs are implemented as tubular sections which are slidably received in bushes that are spaced-apart and fixedly connected with the pivot frame.

18. A race simulator system comprising:
a frame system comprising:
   a base frame configured to be set up on a floor; and
   a pivot frame connected with the base frame in a manner pivotable about a horizontal axis so that an angle of the pivot frame in relation to the base frame is adjustable, said pivot frame comprising:
      adjustable legs provided on the pivot frame, the legs being adjustable in length such that in each pivoted position of the pivot frame relative to the base frame the legs touch the floor;
      a steering wheel console support slidably connectable to the pivot frame;
      a pedal console support slidably connectable to the pivot frame;
      a display support pivotably connected to the adjustable legs; and
      a connection provision connected with the pivot frame;
      wherein the steering wheel console support, the pedal console support, the connection provision and the display support are connected with the pivot frame so that with a pivot movement of the pivot frame these parts together pivot along;
   a steering wheel console mountable on the steering wheel console support, the steering wheel console being provided with a steering wheel;
   a pedal console mountable on the pedal console support, the pedal console being provided with at least a brake pedal and an accelerator pedal; and
   a display mountable on the display support at an elevation above the steering wheel console.

19. The system according to claim 18, wherein the pivot frame comprises:
   a front pivot frame part; and
   a rear pivot frame part;
   wherein a position of the front pivot frame part relative to the rear pivot frame part is adjustable, the front pivot frame part is fixable in different positions relative to the rear pivot frame part;
   wherein the steering wheel console support and the pedal console support are connected on the front pivot frame part, and the connection provision for connecting the chair is connected to the rear pivot frame part.

20. The system according to claim 13, wherein the bush of the first tubular section is two tubular section-shaped bushes that are slidably arranged on the two parallel-extending telescopic section assemblies of the pivot frame, respectively, and the first tubular section extends away from the pivot frame from between the two tubular section-shaped bushes.

* * * * *